US006797762B2

(12) United States Patent
Agostini et al.

(10) Patent No.: US 6,797,762 B2
(45) Date of Patent: Sep. 28, 2004

(54) RUBBER COMPOSITE CONTAINING IN SITU FORMED FILLER REINFORCEMENT, ARTICLE AND TIRE COMPRISING THEREOF

(75) Inventors: Giorgio Agostini, Colmar-Berg (LU); Thierry Florent Edme Materne, Richfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 228 days.

(21) Appl. No.: 10/050,001

(22) Filed: Jan. 15, 2002

(65) Prior Publication Data

US 2003/0019554 A1 Jan. 30, 2003

Related U.S. Application Data

(60) Provisional application No. 60/276,586, filed on Mar. 16, 2001.

(51) Int. Cl.[7] .................................................. C08K 3/34
(52) U.S. Cl. ...................................... 524/493; 524/494
(58) Field of Search ................................ 524/493, 495, 524/496; 525/332.4, 332.5, 332.6, 332.8, 332.9, 333.1, 333.2, 333.3, 333.9, 339, 342, 345

(56) References Cited

U.S. PATENT DOCUMENTS 6,337,358 B1 * 1/2002 Whitehouse et al. ....... 523/200
6,368,239 B1 * 4/2002 Devonport et al. ........ 106/31.6
6,372,820 B1 * 4/2002 Devonport .................. 523/215
6,518,367 B1 * 2/2003 Yatsuyanagi et al. .... 525/332.6
6,551,393 B2 * 4/2003 Devonport et al. ........ 106/31.6

FOREIGN PATENT DOCUMENTS

| EP | 9634900 | 11/1996 | ........... C08F/10/00 |
| EP | 0934957 | 8/1999 | ........... C08F/36/04 |
| EP | 0960890 | 12/1999 | ........... C08F/36/04 |
| EP | 1000960 | 5/2000 | ............. C08J/3/00 |

* cited by examiner

*Primary Examiner*—Ed Cain
*Assistant Examiner*—Katarzyna Wyrozebski
(74) *Attorney, Agent, or Firm*—Henry C. Young, Jr.

(57) ABSTRACT

This invention relates to a rubber composite made from an elastomer polymerized on the surface of a silanized filler, a rubber composition containing such composite and an article such as for example a tire, which has at least one component comprised of such composition. Such reinforcement is applied by polymerizating a conjugated diene hydrocarbon in the presence of a filler silanized with an alkenyl silane. In particular a silanized reinforcing filler is pre-treated with butyl lithium or peroxide catalyst, preferably with butyl lithium, followed by polymerizing a conjugated diene hydrocarbon in the presence of such treated filler via an anionic or free radical polymerization in an organic solvent. Such pre-formed elastomer composite is also contemplated as well as a rubber composition comprised of a blend of such pre-formed composite and at least one additional elastomer. Such filler may be, for example, precipitated silica, carbon black and/or a modified carbon black. A tire having a component of such composite or rubber composition such as, for example a tread, is also provided.

5 Claims, No Drawings

RUBBER COMPOSITE CONTAINING IN SITU FORMED FILLER REINFORCEMENT, ARTICLE AND TIRE COMPRISING THEREOF

This application claims the benefit of U.S. Provisional Application Ser. No. 60/276,586, filed on Mar. 16, 2001.

FIELD OF THE INVENTION

This invention relates to a rubber composite made from an elastomer polymerized on the surface of a silanized filler, a rubber composition containing such composite and an article such as for example a tire, which has at least one component comprised of such composition. Such reinforcement is applied by polymerizating a conjugated diene hydrocarbon in the presence of a filler silanized with an alkenyl silane. In particular a silanized reinforcing filler is pre-treated with butyl lithium or peroxide catalyst, preferably with butyl lithium, followed by polymerizing a conjugated diene hydrocarbon in the presence of such treated filler via an anionic or a free radical polymerization in an organic solvent. Such pre-formed elastomer composite is also contemplated as well as a rubber composition comprised of a blend of such pre-formed composite and at least one additional elastomer. Such filler may be, for example, precipitated silica, carbon black and/or a modified carbon black. A tire having a component of such composite or rubber composition such as, for example a tread, is also provided.

BACKGROUND OF THE INVENTION

Tires are typically prepared of treads of elastomer based rubber compositions which are conventionally carbon black reinforced. Sometimes tire tread rubber compositions are also silica reinforced often with an inclusion of a coupling agent to aid in coupling the reinforcing filler to the rubber.

It is sometimes desired to enhance a homogeneous dispersion of the reinforcing filler in the rubber composition such as, for example, by for efficient or more prolonged mixing of the rubber composition or by other means.

According to WO96/34900 patent publication, a polyolefin composite might be prepared by polymerizing olefin(s) in the presence of (A) a transition metal catalyst, (B) co-catalyst or activator for said transition metal catalyst, and (C) filler.

The product is said to be obtainable as free flowing particles which may be processed into shaped articles such as, for example, injection molding, rotational molding, compression molding, profile extrusion, flat-die film extrusion and co-extrusion.

However, it is desired herein to produce elastomeric compositions containing integral reinforcing fillers via an anionic or a free radical polymerization, a polymerization route not addressed by the above patent publication routes. The free radical polymerization might sometimes be referred to as a radicalar polymerization.

The term "phr" where used herein, and according to conventional practice, refers to "parts of a respective material per 100 parts by weight of rubber, or elastomer".

In the description of this invention, the terms "rubber" and "elastomer" where used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a method of preparing a diene-based elastomer/filler composite, namely, a pre-formed elastomer containing an integral filler dispersion therein, comprises (A) polymerizing at least one conjugated diene hydrocarbon selected from isoprene, 1,3-butadiene and mixtures thereof or copolymerizing at least one conjugated diene selected from isoprene and 1,3-butadiene, and mixtures thereof, styrene in an organic solvent and in the presence of at least one treated particulate filler selected from at least one of precipitated silica, and modified carbon black;

(B) terminating the polymerization reaction; wherein said elastomer composite contains from about 10 to about 100 phr of said filler;

wherein said treated filler is treated by (1) first treating said filler to silanize said filler with an organosilane of the general formula (I):

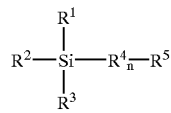

wherein $R^1$, $R^2$ and $R^3$ are equal or individually and independently selected from $CH_3$—, H—, Cl— and (—$OR^6$) and $R^6$ is individually selected from methyl, ethyl and propyl radicals, preferably an ethyl radical and $R^4$ is a —$CH_2$— radical, n is an integer of zero or one, wherein if n is one then $R^4$ is selected from an aryl radical, an alkenylaryl radical, an alkenylarylalkyl radical or an alkylaryl radical, and $R^5$ is selected from an —(CH=$CH_2$) radical, an acrylate or a methacrylate radical followed by (2) treating said silanized filler with said a polymerization initiator selected from butyl lithium, tetramethyl ethylenediamine or peroxide, respectively, initiators of organic solvent anionic and radicalar, as the case may be, diene-based monomer polymerizations.

A significant aspect of this invention is to initiate (start) the polymerization from the filler surface using anionic or radicalar polymerization systems. This aspect of the invention is considered herein to be significant because it improves polymer/filler interaction which is critical to rubber compound performances (tire and non-tire applications).

Representative examples of said organosilanes of formula (I) are, for example: 3-acryloxypropyl-trimethoxy silane; SIA0200.0 Methacryloxymethyl trimethoxy silane (SIM6483.0), methacryloxymethyl triethoxy silane (SIM6482.0), methacryloxymethyl trimethyl silane (SIM6485.6), allyltriethoxysilane (SIA0525.0), allyltrimethoxysilane (SIA0540.0), 5-(biscycloheptenyl) triethoxysilane (SIB0992.0), 3-butenyltriethoxysilane (SIB1928.0), [2-(3-cyclohexenyl)ethyl]trimethoxysilane (SIC2460.0), 3-(cyclopentadienylpropyl)triethoxysilane (SIC2520.0), 3-acryloxypropyl-methyldichlorosilane (SIA0196.0), 3-acryloxypropyl-dimethylmethoxysilane (SIA0190.0), 3-acryloxypropyl-trichlorosilane (SIA0199.0), allylmethyldichlorosilane (SIA0470.0), allyldimethylsilazane (SIA0464.0), 5-(biscycloheptenyl) dimethylchlorosilane (SIB0994.0), 3-butenylmethyldichlorosilane (SIB1926.0), [2-(3-cyclohexenyl)ethyl] dimethylchlorosilane (SIC2457.0), [2-(3-cyclohexenyl)ethyl]trichlorosilane (SIC2459.0), 3-(cyclpentadienyl)trimethylsilane (SIC2522.0), styrylethyl trimethoxysilane (SIS6990.0).

The above organosilanes are referenced according to their catalog numbers from the Gelest catalogue from ABCR GmbH & Co. in D-76151 Karlsruhe Germany P.O. Box 210135.

The invention further contemplates an elastomer composite prepared by the method of this invention.

The invention further contemplates a rubber composition comprised of the said elastomer composite of this invention and at least one additional diene-based elastomer. Such additional diene-based elastomer may be, for example, polymers of isoprene, 1,3-butadiene and mixtures thereof and copolymers of isoprene, 1,3-butadiene and mixtures thereof with styrene.

The invention also contemplates an article of manufacture having at least one component as a rubber composition comprised of said elastomer composite or of said rubber composition which contains said elastomer composite.

The invention additionally contemplates a tire having at least one component as a rubber composition comprised of said elastomer composite or of said rubber composition which contains said elastomer composite.

The carbon black filler for this invention is a rubber reinforcing carbon black, as would be understood by one having skill in the rubber compounding art. Examples of such carbon blacks are described in *The Vanderbilt Rubber Handbook*, 13th Edition, and Pages 417 and 418.

In another aspect of the invention, the modified carbon black filler is such a carbon black which has been treated to contain at least one moiety selected from silanol, siloxane, titanium oxide, titanium hydroxide, zirconium oxide, zirconium hydroxide and aluminum hydroxide groups on the surface thereof.

Modified carbon blacks are also contemplated as carbon blacks containing at least one of allyl and vinyl groups on the surface thereof Representative allyl groups are, for example, methyl allyl and propyl allyl groups. Representative vinyl groups are, for example, methyl vinyl and propyl vinyl groups.

It is to be appreciated that additional carbon black and/or silica may be used in the preparation of such rubber composition where at least one additional elastomer is used with said pre-formed elastomer/filler composite to form the rubber composition.

In another aspect of this invention, the diene-based elastomer may be tin or silicon coupled. If it is coupled, preferably it is tin coupled. Such coupled elastomers, particularly styrene/butadiene tin coupled elastomers are understood to be well known to those having skill in such art.

It is to be appreciated that it is an important aspect of this invention for the preparation of the pre-formed elastomer/filler composite, that one component of the polymerization catalyst is provided as a pre-treated silanized filler composite. In the practice of this invention, the pretreated filler composite is a filler which contains alkenyl radicals on its surface. Such filler composite may be obtained, or pre-treated, for example, by mixing a dehydrated filler in an organic diluent with an organo-silane, followed by drying the resulting filler composite. The filler may be dehydrated by conventional means well known to those skilled in such art.

While various polymerization initiators may be used for polymerizing the diene monomers to form a primarily diene-based elastomer may be used, preferred initiators are (A) butyl lithium (B) TMEDA, which means tetramethyl ethylenediamine and (C) peroxides such as for example, tert-butyl-hydroperoxide and dicumyl peroxide, Redox initiators such as for example $Fe^{++}/Fe^{+++}$ ions typically originating from $FeSO_4$ and from $Fe_2(SO_4)_3$, respectively, ammoniumperoxodisulfate, bis-(tert-butyl peroxide) and benzoic acid peroxide. Such initiators and their use to polymerize diene-based monomers to form elastomers are well known to those having skill in such art.

The polymerization might be conducted, for example, in the following manner:

(A) dehydrating the filler in a suitable oven to a temperature of about 200° C. for about two hours, (B) mixing the dehydrated filler with an organic hydrocarbon solvent such as, for example, toluene, pentane, hexane and/or heptane, to create a dispersion therein, (C) silanizing the surface of the filler followed by (D) addition of said diene hydrocarbon monomers optionally including styrene, (E) allowing a polymerization of the monomer to proceed and form an elastomeric polymer, (F) stopping the polymerization reaction by addition of, for example, a mono-alcohol such as, for example, methanol and cooling the polymerizate and, then (G) recovering the elastomeric polymer composite by filtration and drying the recovered elastomer composite under vacuum (reduced pressure) to remove the solvent.

It is envisioned that the product is recovered as an elastomeric composition, or composite, which contains an integral filler dispersion therein.

In the practice of this invention, a silica coupler may be used for coupling the silica, and optionally the modified carbon black, to one or more of the elastomers in the rubber composition. Such silica coupler conventionally has a moiety, preferably a silane moiety, reactive with (A) at least one of said moieties on the surface of said modified carbon black, and (B) with silanol groups on said silica, if silica is used, and another moiety interactive with at least one of said elastomer(s).

Typical of such coupling agents are bis-(3-trialkoxysilylalkyl) polysulfides. Representative thereof are, for example, bis-(3-triethoxysilylpropyl) polysulfide, having an average of (a) from about 2.1 to 2.6 or (b) from 3.5 to about 4, connecting sulfur atoms in its polysulfidic bridge.

Also, in the practice of this invention, while use of various elastomers are contemplated as hereinbefore discussed, such elastomers may be, for example, selected from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70 to 95 percent trans), high vinyl polybutadiene rubber (having a vinyl content in a range of about 20 to about 90 percent).

The vulcanized rubber composition should contain a sufficient amount of the pre-formed elastomer/filler composite, usually at least about 30, and usually greater than about 40, phr, to contribute a reasonably high modulus, high abrasion resistance and resistance to tear for the cured rubber composition.

In the practice of this invention, additional silica may be present in the rubber composition, if desired, in amounts ranging from about 10 to about 90 phr The commonly employed siliceous pigments used in rubber compounding applications can be used as the silica in this invention, including pyrogenic and precipitated siliceous pigments, including aluminosilicates, although precipitated silicas are usually preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described in the *Journal of the American Chemical Society*, Volume 60, Page 304 (1930).

The silica may also be typically characterized by having a dibutylphthalate (DBP) value in a range of about 100 to about 400, and more usually about 150 to about 300, $cm^3/100$ gm.

Various commercially available silicas may be considered for use in this invention such as, only for example herein, and without limitation, silicas commercially available from PPG Industries under the Hi-Sil trademark with designations 210, 243, etc; silicas available from Rhodia with, for example, designations of Zeosil® 1165MP and Zeosil® 165GR and silicas available from Degussa A. G. with, for example, designations VN2 and VN3, 3370GR, etc. and from Huber as Zeopol® 8745.

It is readily understood by those having skill in the art that the rubber composition would be compounded by methods generally known in the rubber compounding art, such as mixing the various sulfur vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Reinforcing type carbon blacks(s) may also be added to the rubber composition, depending somewhat upon the physical properties desired and intended use of the rubber composition.

It is to be appreciated that the silica coupler and/or the silica silylating agent, if in a liquid form, may be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr.

Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of the prescribed silylating agent in combination with a silica coupler in a silica reinforced rubber composition.

The presence and relative amounts of the other additives, as hereinbefore described, are not considered to be an aspect of the present invention which is more primarily directed to the utilization of the prescribed pre-formed elastomer/filler composite.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, silica, silica coupler, silica silylating agent, and carbon black if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 190° C.

The rubber composition of this invention can be used for various purposes. For example, it can be used for various tire compounds. Such tires can be built, shaped, molded and cured by various methods which are known and will be readily apparent to those having skill in such art.

While various embodiments are disclosed herein for practicing the invention, it will be apparent to those skilled in this art that various changes and modifications may be made therein without departing from the spirit or scope of the invention.

What is claimed is:

1. A method of preparing a diene-based elastomer/filler composite which comprises
   (A) polymerizing at least one conjugated diene hydrocarbon selected from isoprene, 1,3-butadiene and mixtures thereof or copolymerizing at least one conjugated diene selected from isoprene and 1,3-butadiene, and mixtures thereof, styrene in an organic solvent and in the presence of at least one treated particulate filler wherein said particulate filler is a precipitated silica,
   (B) terminating the polymerization reaction; wherein said elastomer composite contains from about 10 to about 100 phr of said filler;
   wherein said treated filler is treated by
   (1) first treating said filler to silanize said filler with an organosilane followed by
   (2) treating said silanized filler with said a polymerization initiator is selected from butyl lithium or tetramethyl ethylenediamine;
   wherein said organosilane is selected from the group consisting of 3-acryloxypropyl-trimethoxy silane, methacryloxymethyl trimethoxy silane, methacryloxymethyl triethoxy silane, methacryloxymethyl trimethyl silane, allyltriethoxysilane, allyltrimethoxysilane, 5-(biscycloheptenyl)triethoxysilane, 3-butenyltriethoxysilane, [2-(3-cyclohexenyl)ethyl]trimethoxysilane, 3-(cyclpentadienylpropyl)triethoxysilane, 3-acryloxypropyl-methyldichlorosilane, 3-acryloxypropy-dimethylmethoxysilane, 3-acryloxypropyl-trichlorosilane, allylmethyldichlorosilane, allyldimethylsilazane, 5-(biscycloheptenyl)dimethylchlorosilane, 3-butenylmethyldichlorosilane, [2-(3-cyclohexenyl)ethyl]dimethylchlorosilane, [2-(3-cyclohexenyl)ethyl]trichlorosilane, 3-(cyclopentadienyl)trimethylsilane, and styrylethyl trimethoxysilane.

2. An elastomer/filler composite prepared by the method of claim 1.

3. A rubber composition comprised of said elastomer/filler composite of claim 2 and at least one additional elastomer selected from polymers of isoprene, 1,3-butadiene and mixtures thereof and copolymers of isoprene, 1,3-butadiene and mixtures thereof with styrene.

4. An article of manufacture having at least one component of a rubber composition comprised of the elastomer/filler composite of claim 2.

5. A tire having at least one component of a rubber composition comprised of the elastomer/filler composite of claim 2.

* * * * *